(12) United States Patent
Wigdor et al.

(10) Patent No.: US 9,830,015 B2
(45) Date of Patent: Nov. 28, 2017

(54) ORTHOGONAL FREQUENCY SCAN SCHEME IN TOUCH SYSTEM

(71) Applicant: Tactual Labs Co., New York, NY (US)

(72) Inventors: Daniel Wigdor, Toronto (CA); Darren Leigh, Round Hill, VA (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 15/476,580

(22) Filed: Mar. 31, 2017

(65) Prior Publication Data

US 2017/0205947 A1    Jul. 20, 2017

Related U.S. Application Data

(63) Continuation of application No. 14/217,015, filed on Mar. 17, 2014, which is a continuation-in-part of application No. 13/841,436, filed on Mar. 15, 2013, now Pat. No. 9,019,224.

(51) Int. Cl.
*G06F 3/041* (2006.01)
*G06F 3/044* (2006.01)
*G06F 3/0354* (2013.01)

(52) U.S. Cl.
CPC ............ G06F 3/0416 (2013.01); G06F 3/044 (2013.01); *G06F 3/03542* (2013.01); *G06F 3/03545* (2013.01); *G06F 2203/0382* (2013.01); *G06F 2203/04104* (2013.01)

(58) Field of Classification Search
CPC ........ G06F 3/041; G06F 3/0412; G06F 3/044; G06F 3/03545; G06F 2203/04104
USPC ................................................. 345/173, 174
See application file for complete search history.

(56) References Cited

U.S. PATENT DOCUMENTS

| 8,552,998 | B2 * | 10/2013 | Hotelling | G06F 3/0416 345/156 |
| 8,605,054 | B2 * | 12/2013 | Krenik | G06F 3/0418 345/173 |
| 8,766,931 | B2 * | 7/2014 | Westhues | G06F 3/044 178/18.06 |

(Continued)

OTHER PUBLICATIONS

Notice of Allowance and Fee(s) Due dated Mar. 6, 2017, U.S. Appl. No. 14/059,411, filed Oct. 21, 2013, 7 pages.

*Primary Examiner* — Jason Mandeville
(74) *Attorney, Agent, or Firm* — Adam B. Landa

(57) ABSTRACT

System and processes for transmitting orthogonal frequencies on a touch sensor are provided. In one example process, the rows of the sensor panel can have signals transmitted thereon having orthogonal frequencies. The orthogonal frequencies can be separated by a frequency spacing ($\Delta f$) that is at least the reciprocal of a measurement period $\tau$ (e.g., an integration time) of the touch sensor. Touch events cause and correspond to signals on the columns, which can be received by a receive system including appropriate amplifiers. The orthogonal frequencies can be detected by the receiver with a Fourier Transform or filter bank. Separate digitization and signal processing can be implemented for every column. The receiver can measure the quantity of each of the orthogonal transmitted signals present on each column, identifying the rows in touch with each column and may also provide additional (e.g., qualitative) information concerning the touch.

14 Claims, 2 Drawing Sheets

(56) References Cited

U.S. PATENT DOCUMENTS

| | | | |
|---|---|---|---|
| 9,678,609 B2* | 6/2017 | Yao | G06F 3/044 |
| 2008/0158167 A1* | 7/2008 | Hotelling | G06F 3/0416 |
| | | | 345/173 |
| 2011/0084857 A1* | 4/2011 | Marino | G06F 3/044 |
| | | | 341/5 |
| 2012/0013546 A1* | 1/2012 | Westhues | G06F 3/044 |
| | | | 345/173 |
| 2014/0198053 A1* | 7/2014 | Yoon | G06F 3/0416 |
| | | | 345/173 |
| 2015/0109212 A1 | 4/2015 | Yao et al. | |

\* cited by examiner

ORTHOGONAL FREQUENCY SCAN SCHEME IN TOUCH SYSTEM

This application is a continuation of and claims priority to U.S. patent application Ser. No. 14/217,015 entitled "Fast Multi-Touch Sensor With User-Identification Techniques" filed Mar. 17, 2014 which is a continuation-in-part of U.S. patent application Ser. No. 13/841,436 entitled "Low-Latency Touch Sensitive Device" filed Mar. 15, 2013, now U.S. Pat. No. 9,019,224 B2. A portion of the disclosure of this patent document contains material which is subject to copyright protection. The copyright owner has not objection to the facsimile reproduction by anyone of the patent document or the patent disclosure, as it appears in the Patent and Trademark Office files or records, but otherwise reserves all copyright rights whatsoever.

FIELD

The present invention relates in general to the field of user input, and in particular to user input systems which deliver a low-latency user experience.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Disclosed are a sensor and method that provide detection of touch events from human fingers on a two-dimensional manifold and have the capability for multiple simultaneous touch events to be detected and distinguished from each other. In accordance with an embodiment, the touch events may be detected, processed and supplied to downstream computational processes with very low latency, e.g., on the order of one millisecond or less.

In an embodiment, the invention provides a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique.

Figure 1:
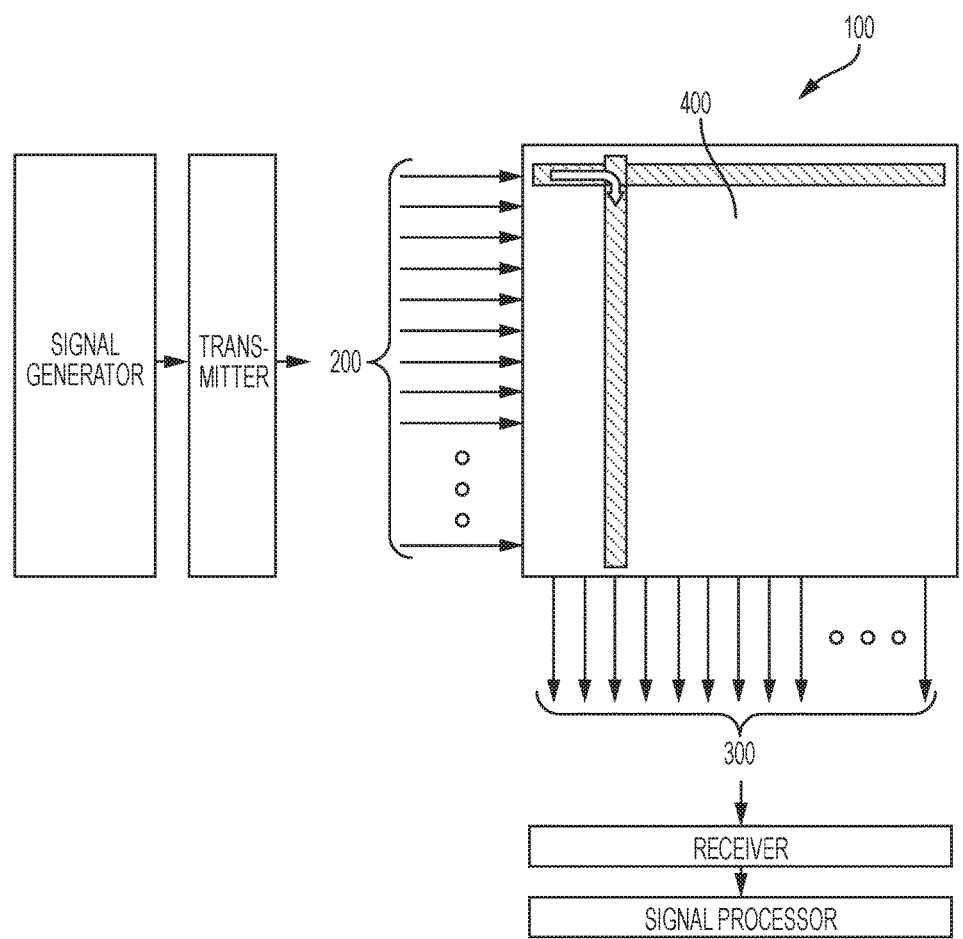
FIG. 1 provides a high level block diagram illustrating an embodiment of a low-latency touch sensor device.

FIG. 1 illustrates certain principles of the invention in accordance with an embodiment of a touch sensor 100. At reference no. 200, a different signal is transmitted into each of the surface's rows. The signals are designed to be "orthogonal", i.e. separable and distinguishable from each other. At reference no. 300, a receiver is attached to each column. The receiver is designed to receive any of the transmitted signals, or an arbitrary combination of them, and to individually measure the quantity of each of the orthogonal transmitted signals present on that column. The touch surface 400 of the sensor comprises a series of rows and columns (not all shown), along which the orthogonal signals can propagate. The rows and columns are designed so that, when they are not being touched, a negligible amount of signal is coupled between them.

With continued reference to FIG. 1, generally, the capacitive result of a touch event in the proximity of both a row and column will cause a non-negligible amount of signal present on the row to be coupled to the column, thus, touch events generally cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row, the signals found on the column indicate which rows are being touched simultaneously with that column. The quantity of each signal received is generally related to the amount of coupling between the column and the row carrying the corresponding signal, and thus, may indicate the area of the surface covered by the touch, the pressure of the touch, etc.

When a row and column are touched simultaneously, some of the signal that is present on the row is coupled into the corresponding column. (As used herein, the term touch or touched does not require actual physical contact, but rather, close proximity. Indeed, in many embodiments, physical contact is unlikely as there is generally a protective barrier between the rows and/or columns and the finger or other object of touch. Moreover, generally, the rows and columns themselves are not in touch with each other, but rather, placed in a proximity that prevents more than a negligible amount of signal to be coupled there-between. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.)

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). In fact, it is not even necessary that the rows and columns be in a grid at all. Other shapes are possible as long as a touch event will simultaneously touch part of a "row" and part of a "column", and cause some form of coupling. For example, the "rows" could be in concentric circles and the "columns" could be spokes radiating out from the center. Moreover, it is not necessary for there to be only two types signal propagation channels: instead of rows and columns, channels "A", "B" and "C" may be provided, where signals transmitted on "A" could be received on "B" and "C" or signals transmitted on "A" and "B" could be received on "C". It is also possible that the signal propagation channels can alternate function, sometimes supporting transmitters and sometimes supporting receivers. Many alternative embodiments are possible and will be apparent to a person of skill in the art after considering this disclosure.

As noted above, in an embodiment the touch surface 400 comprises of a series of rows and columns, along which signals can propagate. As discussed above, the rows and columns are designed so that, when they are not being touched, a negligible amount of signal is coupled between them. Moreover, a different signal is transmitted into each of the rows. In an embodiment, each of these different signals are orthogonal (i.e. separable and distinguishable) from one another. When a row and column are touched simultaneously, a non-negligible amount of the signal that is present on the row is coupled into the corresponding column. The quantity of the signal that is coupled onto a column may be related to the pressure or area of touch.

A receiver 300 is attached to each column. The receiver is designed to receive non-negligible amounts any of the orthogonal signals, or an arbitrary combination of the orthogonal signals, and to identify the columns providing non-negligible amounts of signal. In an embodiment, the receiver may measure the quantity of each of the orthogonal transmitted signals present on that column. In this manner, in addition to identifying the rows in touch with each column, the receiver can provide additional (e.g., qualitative) information concerning the touch. In general, touch events may correspond to the received signals on the columns. For each column, the different signals received thereon indicate which of the corresponding rows is being touched simultaneously with that column. In an embodiment, the non-negligible quantity of each signal received may be related to the amount of coupling between the corresponding row and column and may indicate the area of the surface covered by the touch, the pressure of the touch, etc.

Simple Sinusoid Embodiment

In this simple embodiment of the technology, the orthogonal signals being transmitted into the rows are unmodulated sinusoids, each of which has a different frequency. In an embodiment, the frequencies are chosen so that they can be easily distinguished from each other in the receiver. One way to select frequencies that they can be easily distinguished from each other in the receiver involves providing sufficient spacing between them, and ensuring that no simple harmonic relationships exist between them, thus mitigating non-linear artifacts that may cause one signal to mimic another.

A "comb" of frequencies, where the spacing between adjacent frequencies is constant, and the highest frequency is less than twice the lowest, will generally meet these criteria if the spacing between frequencies, $\Delta f$, is at least the reciprocal of the measurement period $\tau$. For example, if it is desired to measure a combination of signals (from a column, for example) to determine which row signals are present once per millisecond, then the frequency spacing must be greater than one kilohertz (i.e., $\Delta f > 1/\tau$). According to this calculation, for a trivial case with only ten rows, one could use the following frequencies:

| Row 1: | 5.000 MHz |
|---|---|
| Row 2: | 5.001 MHz |
| Row 3: | 5.002 MHz |
| Row 4: | 5.003 MHz |
| Row 5: | 5.004 MHz |
| Row 6: | 5.005 MHz |
| Row 7: | 5.006 MHz |
| Row 8: | 5.007 MHz |
| Row 9: | 5.008 MHz |
| Row 10: | 5.009 MHz |

In an embodiment, frequency spacing should be substantially greater than this minimum to permit robust design. As a notional example, a 20 cm by 20 cm touch surface with 0.5 cm row/column spacing would require forty rows and forty columns and necessitate sinusoids at forty different frequencies. While a once per millisecond analysis rate would require only 1KHz spacing, in an embodiment, an arbitrarily larger spacing is utilized for a more robust implementation. The arbitrarily larger spacing is subject to the constraint that the maximum frequency should not be more than twice the lowest (i.e. $f_{max} < 2(f_{min})$). In this notional example, a frequency spacing of 100 kHz with the lowest frequency set at 5 MHz may be used, yielding a frequency list of 5.0 MHz, 5.1 MHz, 5.2 MHz, etc. up to 8.9 MHz.

In an embodiment, each of the sinusoids on the list may be generated by a signal generator and transmitted on a separate row by the transmitter. To identify the rows and columns that are being simultaneously touched, a receiver receives any signals present on the columns and a signal processor analyzes the signal to determine which, if any, frequencies on the list appear. In an embodiment, the identification can be supported with a frequency analysis technique (e.g., Fourier transform), or by using a filter bank.

In an embodiment, from each column's signal, the receiver can determine the strength of each frequency from the list of frequencies found in the signal on that column. In an embodiment, where the strength of a frequency is greater than some threshold, the signal processor identifies there being a touch event between the column and the row corresponding to that frequency. In an embodiment, signal strength information, which may correspond to various physical phenomena including the size of the touch tool, the pressure with which the tool is pressing down, the fraction of row/column intersection that is being touched, etc. may be used as an aid to localize the area of the touch event.

In an embodiment, once the signals strengths have been calculated for each frequency (corresponding to a row) for each column, a two-dimensional map can be created, with the signal strength being the value of the map at that row/column intersection. In an embodiment, due to physical differences in the touch surface at different frequencies, it will likely be necessary to normalize the signal strength responses for a given touch.

In an embodiment, the two-dimensional map data may be thresholded to better identify, determine or isolate touch events. In an embodiment, the two-dimensional map data may be used to infer information about the shape, orientation, etc. of the object touching the surface.

Of course, a sinusoid is not the only orthogonal signal that can be used in the configuration described above, and indeed, as discussed above, any set of signals that can be distinguished from each other would work. Nonetheless, sinusoids have some advantageous properties that may permit simpler engineering and more cost efficient manufacture of devices which use this technique. Sinusoids have a very narrow frequency profile (by definition), and need not extend down to low frequencies, near DC. Sinusoids are relatively unaffected by 1/f noise, which could be an issue for signals that extend to much lower frequencies.

In an embodiment, sinusoids may be detected by filter banks or frequency analysis techniques (e.g., Fourier transform), which can be implemented in a relatively efficient manner and which tend to have good dynamic range characteristics, allowing them to detect and distinguish between a large number of simultaneous sinusoids. In broad signal processing terms, the receiver's decoding of multiple sinusoids may be thought of as a form of frequency-division multiplexing. In an embodiment, other modulation techniques such as time-division and code-division multiplexing could also be used, but these techniques may have disadvantages when applied to an implementation of the present sensor. Time division multiplexing has good dynamic range characteristics, but requires that a finite time be expended transmitting into (or analyzing received signals from) the touch surface, conflicting with the goal of a low latency device. Code division multiplexing has the same simultaneous nature as frequency-division multiplexing, but may encounter dynamic range problems and may not distinguish as easily between multiple simultaneous signals.

Modulated Sinusoid Embodiment

In an embodiment, a modulated sinusoid may be used in lieu of, and as an enhancement of, the simple sinusoid embodiment described above. The use of unmodulated sinusoids may cause radiofrequency interference to other devices near the touch surface, and thus, a device employing such might encounter problems passing regulatory testing (e.g., FCC, CE). In addition, the use of unmodulated sinusoids may be susceptible to interference from other sinusoids in the environment, whether from deliberate transmitters or from other interfering devices (perhaps even another identical touch surface). In an embodiment, such interference may cause false or degraded touch measurements in the described device.

In an embodiment, to avoid interference, the sinusoids may be modulated or "stirred" prior to being transmitted by the transmitter in a manner that the signals can be demodulated ("unstirred") once they reach the receiver. Generally, any form of invertible transformation may be used, such that the transformation can be compensated for and the signals restored once they reach the receiver. Generally, it has been found that signals emitted or received using a modulation technique are less correlated with other things, and thus, act more like mere noise, rather than appearing to be similar to, and/or being subject to interference from, other signals present in the environment.

In an embodiment, the modulation technique utilized will cause the transmitted data to appear fairly random, or least, unusual in the environment of the device operation. Two modulation schemes are discussed below: Frequency Modulation and Direct Sequence Spread Spectrum Modulation.

Frequency Modulation

Frequency modulation of the entire set of sinusoids keeps them from appearing at the same frequencies by "smearing them out". Because regulatory testing is generally concerned with fixed frequencies, transmitted sinusoids that are frequency modulated will appear at lower levels, and thus, be less likely to be a concern. Because the receiver will "un-smear" any sinusoid input to it, in an equal and opposite fashion, the deliberately modulated, transmitted sinusoids can be demodulated and will thereafter appear substantially as they did prior to modulation. Any fixed frequency sinusoids that enter (e.g., interfere) from the environment, however, will be "smeared out" by the "unsmearing" operation. Accordingly, interference that might otherwise be caused to the sensor is lessened by employing frequency modulation, e.g., to a comb of frequencies that, in an embodiment, are used in the touch sensor.

In an embodiment, the entire set of sinusoids may be frequency modulated by generating them all from a single reference frequency that is, itself, modulated. For example, a set of sinusoids with 100 kHz spacing can be generated by multiplying the same 100 kHz reference frequency by different integers. In an embodiment this technique can be accomplished using phase-locked loops. To generate the first 5.0 MHz sinusoid, one could multiply the reference by 50, to generate the 5.1 MHz sinusoid, one could multiply the reference by 51, and so forth. The receiver can use the same modulated reference to perform the detection and demodulation functions.

Direct Sequence Spread Spectrum Modulation

In an embodiment, the sinusoids may be modulated by periodically inverting them on a pseudo-random (or even truly random) schedule known to both the transmitter and receiver. Thus, in an embodiment, before each sinusoid is transmitted to its corresponding row, it is passed through a selectable inverter circuit, the output of which is the input signal multiplied by +1 or −1 depending on the state of an "invert selection" input. In an embodiment, all of these "invert selection" inputs are driven from the same signal, so that the sinusoids for each row are all multiplied by either +1 or −1 at the same time. In an embodiment, the signal that drives the "invert selection" input may be a pseudorandom function that is independent of any signals or functions that might be present in the environment. The pseudorandom inversion of the sinusoids spreads them out in frequency, causing them to appear like random noise so that they interfere negligibly with any devices with which they might come in contact.

On the receiver side, the signals from the columns may be passed through selectable inverter circuits that are driven by the same pseudorandom signal as the ones on the rows. The result is that, even though the transmitted signals have been spread in frequency, they are despread before the receiver because they have been ben multiplied by either +1 or -1 twice, leaving them unmodified. Applying direct sequence spread spectrum modulation may spread out any interfering signals present on the columns so that they act only as noise and do not mimic any of the set of intentional sinusoids.

In an embodiment, selectable inverters can be created from a small number of simple components and/or can be implemented in transistors in a VLSI process.

Because many modulation techniques are independent of each other, in an embodiment, multiple modulation techniques could be employed at the same time, e.g. frequency modulation and direct sequence spread spectrum modulation of the sinusoid set. Although potentially more complicated to implement, such multiple modulated implementation may achieve better interference resistance.

Because it would be extremely rare to encounter a particular pseudo random modulation in the environment, it is likely that the sensors of the invention would not require a truly random modulation schedule. The one likely exception is when more than one touch surface with the same implementation is being touched by the same person. In such a case, it may be possible for the surfaces to interfere with each other, even if they use very complicated pseudo random schedules. In an embodiment, care is taken to design pseudo random schedules that are unlikely to conflict. In an embodiment, some true randomness is introduced into the modulation schedule. In an embodiment, randomness is introduced by seeding the pseudo random generator from a truly random source and ensuring that it has a sufficiently long output duration (before it repeats). Such an embodiment makes it highly unlikely that two touch surfaces will ever be using the same portion of the sequence at the same time. In an embodiment, randomness is introduced by exclusive or'ing (XOR) the pseudo random sequence with a truly random sequence. The XOR function combines the entropy of its inputs, so that the entropy of its output is never less than either input.

A Low-Cost Implementation Embodiment

Touch surfaces using the previously described techniques may have a relatively high cost associated with generating and detecting sinusoids compared to other methods. Below are discussed methods of generating and detecting sinusoids that may be more cost-effective and/or be more suitable for mass production.

Sinusoid Detection

In an embodiment, sinusoids may be detected in a receiver using a complete radio receiver with a Fourier Transform detection scheme. Such detection may require digitizing a high-speed RF waveform and performing digital signal processing thereupon. Separate digitization and signal processing may be implemented for every column of the surface, this would permit the signal processor to discover which of the row signals are in touch with that column. In the above-noted example, having a touch surface with forty rows and forty columns, would require forty copies of this signal chain. Today, digitization and digital signal processing are relatively expensive operations, in terms of hardware, cost, and power. It would be useful to utilize a more cost-effective method of detecting sinusoids, especially one that could be easily replicated and requires very little power.

In an embodiment, sinusoids may be detected using a filter bank. A filter bank comprises an array of bandpass filters that can take an input signal and break it up into the frequency components associated with each filter. The Discrete Fourier Transform (DFT, of which the FFT is an efficient implementation) is a form of a filter bank with evenly-spaced bandpass filters that is commonly used for frequency analysis. DFTs may be implemented digitally, but the digitization step is expensive. It is possible to implement a filter bank out of individual filters, such as passive LC (inductor and capacitor) or RC active filters (involving). Inductors are notoriously difficult to implement well on VLSI processes, and discrete inductors are large and expensive, so it may not be cost effective to use inductors in the filter bank.

At lower frequencies (about 10 MHz and below), it is possible to build banks of RC active filters on VLSI. These might perform well, but could take up a lot of die space and require more power than is desirable.

At higher frequencies, it is possible to build filter banks with surface acoustic wave (SAW) filter techniques. These allow nearly arbitrary FIR filter geometries. However, they require piezoelectric materials, which are more expensive than straight CMOS VLSI, and may not allow enough simultaneous taps to integrate sufficiently many filters into a single package, thereby raising the manufacturing cost.

In an embodiment, sinusoids may be detected using an analog filter bank implemented with switched capacitor techniques on standard CMOS VLSI processes that employs an FFT-like "butterfly" topology. The die area required for such an implementation is a function of the square of the number of channels, meaning that a 64-channel filter bank using the same technology would require only $\frac{1}{256}$th of the die area of the 1024-channel version. In an embodiment, the complete receive system for the low-latency touch sensor is implemented on a plurality of VLSI dies, including an appropriate set of filter banks and the appropriate amplifiers, switches, energy detectors, etc. In an embodiment, the complete receive system for the low-latency touch sensor is implemented on a single VLSI die, including an appropriate set of filter banks and the appropriate amplifiers, switches, energy detectors, etc. In an embodiment, the complete receive system for the low-latency touch sensor is implemented on a single VLSI die containing n instances of an n-channel filter bank, and leaving room for the appropriate amplifiers, switches, energy detectors, etc.

Sinusoid Generation

Generating the transmit signals (e.g., sinusoids) in a low-latency touch sensor is generally less complex than detection, principally because each row requires the generation of a single signal while the column receivers have to detect and distinguish between many signals. In an embodiment, sinusoids can be generated with a series of phase-locked loops (PLLs), each of which multiply a common reference frequency by a different multiple.

In an embodiment, the low-latency touch sensor design does not require that the transmitted sinusoids are of very high quality, but rather, accommodates transmitted sinusoids that have more phase noise, frequency variation (over time, temperature, etc.), harmonic distortion and other imperfections than may usually be allowable or desirable in radio circuits. In an embodiment, the large number of frequencies may be generated by digital means and then employ a relatively coarse analog-to-digital conversion process. As discussed above, in an embodiment, the generated row frequencies should have no simple harmonic relationships with each other, any non-linearities in the described generation process should not cause one signal in the set to "alias" or mimic another.

In an embodiment, a frequency comb may be generated by having a train of narrow pulses filtered by a filter bank, each filter in the bank outputting the signals for transmission on a row. The frequency "comb" is produced by a filter bank that may be identical to a filter bank that can be used by the receiver. As an example, in an embodiment, a 10 nanosecond pulse repeated at a rate of 100 kHz is passed into the filter bank that is designed to separate a comb of frequency components starting at 5 MHz, and separated by 100 kHz. The pulse train as defined would have frequency components from 100 kHz through the tens of MHz, and thus, would have a signal for every row in the transmitter. Thus, if the pulse train were passed through an identical filter bank to the one described above to detect sinusoids in the received column signals, then the filter bank outputs will each contain a single sinusoid that can be transmitted onto a row.

Transparent Display Surface

It may be desirable that the touch surface be integrated with a computer display so that a person can interact with computer-generated graphics and imagery. While front projection can be used with opaque touch surfaces and rear projection can be used with translucent ones, modern flat panel displays (LCD, plasma, OLED, etc.) generally require that the touch surface be transparent. In an embodiment, the present technique's rows and columns, which allow signals to propagate along them, need to be conductive to those signals. In an embodiment, the present technique's rows and columns, which allow radio frequency signals to propagate along them, need to be electrically conductive.

If the rows and columns are insufficiently conductive, the resistance per unit length along the row/column will combine with the capacitance per unit length to form a low-pass filter: any high-frequency signals applied at one end will be substantially attenuated as they propagate along the poor conductor.

Visually transparent conductors are commercially available (e.g. indium-tin-oxide or ITO), but the tradeoff between transparency and conductivity is problematic at the frequencies that may be desirable for some embodiments of the low-latency touch sensor described herein: if the ITO were thick enough to support certain desirable frequencies over certain lengths, it may be insufficiently transparent for some applications. In an embodiment, the rows and/or columns may be formed entirely, or at least partially, from graphene and/or carbon nanotubes, which are both highly conductive and optically transparent.

In an embodiment, the rows and/or columns may be formed from one or more fine wires that block a negligible amount of the display behind them. In an embodiment, the fine wires are too small to see, or at least too small to present a visual impediment when viewing a display behind it. In an embodiment, fine silver wires patterned onto transparent glass or plastic can be used to make up the rows and/or columns. Such fine wires need to have sufficient cross section to create a good conductor along the row/column, but it is desirable (for rear displays) that such wires are small enough and diffuse enough to block as little of the underlying display as appropriate for the application. In an embodiment, the fine wire size is selected on the basis of the pixels size and/or pitch of the underlying display.

As an example, the new Apple Retina displays comprises about 300 pixels per inch, which yields a pixel size of about 80 microns on a side. In an embodiment, a 20 micron diameter silver wire 20 centimeters long (the length of an iPad display), which has a resistance of about 10 ohms, is used as a row and/or column and/or as part of a row and/or column in a low-latency touch sensor as described herein. Such 20 micron diameter silver wire, however, if stretched across a retina display, may block up to 25% of an entire line of pixels. Accordingly, in an embodiment, multiple thinner diameter silver wires may be employed as a column or row, which can maintain an appropriate resistance, and provide acceptable response with respect to radiofrequency skin depth issues. Such multiple thinner diameter silver wires can be laid in a pattern that are not straight, but rather, somewhat irregular. A random or irregular pattern of thinner wires is likely to be less visually intrusive. In an embodiment, a mesh of thin wires is used; the use of a mesh will improve robustness, including against manufacturing flaws in patterning. In an embodiment, single thinner diameter wires may be employed as a column or row, provided that the thinner is sufficiently conductive to maintain an appropriate level resistance, and acceptable response with respect to radiofrequency skin depth issues.

Figure 2:
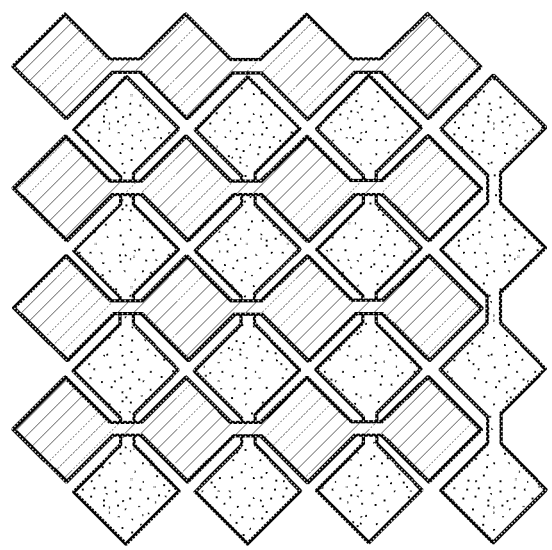
FIG. 2 illustrates an embodiment of a layout for crossing conductive paths that can be used in an embodiment of a low-latency touch sensor device.

FIG. 2 illustrates an embodiment of a row/column touch surface that has a diamond-shaped row/column mesh. This mesh pattern is designed to provide maximal and equal surface area to the rows and columns while permitting minimal overlap between them.

A touch event with an area greater than one of the diamonds will cover at least part of a row and a column, which will permit some coupling of a row signal into the overlapped column. In an embodiment, the diamonds are sized to be smaller than the touching implement (finger, stylus, etc.). In an embodiment, a 0.5 cm spacing between rows and columns performs well for human fingers.

In an embodiment a simple grid of wires is employed as the rows and columns. Such a grid would provide less surface area for the rows and columns, but can suffice for radio frequency signals, and provide a sufficient non-negligible coupling which can be detected by a receiver.

In an embodiment, the "diamond patterns" for the rows and columns, as shown in FIG. 2, can be created by using a randomly connected mesh of thin wires that fills the space of the indicated shapes, or by combining wire mesh and an another transparent conductor such as ITO. In an embodiment, thin wires may be used for long stretches of conductivity, e.g., across the entire screen, and ITO may be used for local areas of conductivity, such as the diamond-shaped areas.

An Optical Embodiment

While radiofrequency and electrical methods of implementing the described fast multi-touch technique have been discussed above, other media can be employed as well. For example, the signals can be optical signals (i.e., light), having waveguides or other means for the rows and columns. In an embodiment, the light, used for the optical signals may be in the visible region, the infrared and/or the ultraviolet.

In an embodiment, instead of electrically conductive rows and columns that carry radiofrequency signals, the rows and columns could comprise optical waveguides, such as optical fiber, fed by one or more light sources that generate orthogonal signals and are coupled to the waveguides by an optical coupler. For example, a different distinct wavelength of light could be injected into each row fiber. When a human finger touches a row fiber, some of the light in it will leak (i.e., couple) into the finger, due to frustrated total internal reflection. Light from the finger may then enter one of the column fibers, due to the reciprocal process, and propagate to a detector at the end of the fiber.

In an embodiment, optical signals may be generated with LEDs of different wavelengths, or by using optical filters. In an embodiment, custom interference filters are employed. In an embodiment, the different wavelengths of light present on the fiber columns can be detected using optical filter banks. In an embodiment, such optical filter banks may be implemented using custom interference filters. In an embodiment, wavelengths of light outside the visible spectrum (e.g., infrared and/or ultraviolet light) may be used to avoid adding extra visible light to the display.

In an embodiment, the row and column fibers may be woven together so that a finger can touch them simultaneously. In an embodiment, the woven construction may be made as visually transparent as needed to avoid obscuring the display.

Further details regarding touch sensors, methods and uses of the invention will be apparent from the disclosure of co-pending U.S. Provisional Patent Application No. 61/710, 256 filed Oct. 5, 2012, the entire disclosure of which, including the source code appendix, is incorporated herein by reference.

Various modifications and alterations to the invention will become apparent to those skilled in the art without departing from the scope and spirit of this invention. It should be understood that the invention is not intended to be unduly limited by the specific embodiments and examples set forth herein, and that such embodiments and examples are presented merely to illustrate the invention, with the scope of the invention intended to be limited only by the claims attached hereto. Thus, while the invention has been particularly shown and described with reference to a preferred embodiment thereof, it will be understood by those skilled in the art that various changes in form and details may be made therein without departing from the spirit and scope of the invention.

What is claimed is:

1. A system comprising:
signal generator operable to generate a plurality of signals having a plurality of orthogonal frequencies, each orthogonal frequency of the plurality of orthogonal frequencies being a different frequency, the plurality of signals simultaneously driving a plurality of rows of a touch sensor, wherein frequencies of the plurality of orthogonal frequencies are spaced by a frequency that is at least a reciprocal of a predetermined measurement period of the touch sensor, and a highest orthogonal frequency of the plurality of orthogonal frequencies is less than twice a lowest orthogonal frequency of the plurality of frequencies.

2. The system of claim 1, wherein the system further comprises:
the touch sensor, the touch sensor comprising:
the plurality of rows, wherein each of the plurality of rows is coupled to receive a different signal of the plurality of signals from the signal generator; and
a plurality of columns capacitively coupled to the plurality of rows; and
receiver coupled to receive a plurality of signals from the plurality of columns and operable to detect a touch event associated with the touch sensor based on the received plurality of signals.

3. The system of claim 2, wherein the signal processor for each of the plurality of columns are the same signal processor.

4. The system of claim 1, wherein the signal generator comprises, for each of the plurality of signals:
a digital generator;
a digital to analog converter coupled to receive an output of he digital generator; and
a transmitter coupled to receive an output of the digital to analog converter and coupled to output a signal of the plurality of signals to a row of the plurality of rows.

5. A system comprising:
a touch sensor comprising:
a first row; and
a second row; and
signal generator coupled to the first and second rows and operable to:
generate on the first row a first signal having a first frequency; and
generate on the second row a second signal having a second frequency,
the second frequency different from the first frequency, wherein:
a difference between the first frequency and the second frequency is at least a reciprocal of a predetermined measurement period of the touch sensor, and either the first frequency is less than twice the second frequency or the second frequency is less than twice the first frequency, and
the signal generator simultaneously generating signals on the first row with the first signal and the second row with the second signal.

6. The system of claim 5, wherein the touch sensor further comprises a plurality of columns capacitively coupled to the first and second rows, and wherein the system further comprises receiver coupled to receive a plurality of signals from the plurality of columns and operable to detect a touch event associated with the touch sensor based on the received plurality of signals.

7. The system of claim 5, wherein the system is included within a computer display, flat panel display, LCD display, plasma display or OLED display.

8. A system comprising:
a touch sensor comprising:
a plurality of rows; and
a column capacitively coupled to the plurality of rows; and
signal generator coupled to the plurality of rows and operable to simultaneously generate on the plurality of rows a plurality of row signals, each row signal of the plurality of row signals having a different frequency, wherein:
the plurality of row signals are spaced by a frequency that is a reciprocal of a predetermined measurement period of the touch sensor, and a highest row signal frequency of the plurality of row signals is set to be less than twice a lowest row signal frequency of the plurality of row signals,
the column is operable to generate a column signal in response to the plurality of rows being driven by the row signals, and
the column signal comprises an interference component having a frequency corresponding to a difference in frequency between the frequencies of the row signals.

9. The system of claim 8, wherein the system further comprises receiver coupled to receive the column signal from the column and operable to detect a touch event associated with the touch sensor based on the received column signal.

10. The system of claim 8, wherein the frequencies of the row signals are orthogonal.

11. A system comprising:
signal generator operable to generate a plurality of signals having a plurality of orthogonal frequencies, each orthogonal frequency of the plurality of orthogonal frequencies being a different frequency, the plurality of signals simultaneously driving a plurality of rows of a touch sensor, wherein frequencies of the plurality of orthogonal frequencies are spaced by a frequency that is a reciprocal of a predetermined measurement period of the touch sensor, and a highest orthogonal frequency of the plurality of orthogonal frequencies is less than twice a lowest orthogonal frequency of the plurality of frequencies.

12. The system of claim 11, wherein the system further comprises:
the touch sensor, the touch sensor comprising:
the plurality of rows, wherein each of the plurality of rows is coupled to receive a different signal of the plurality of signals from the signal generator; and
a plurality of columns capacitively coupled to the plurality of rows; and
receiver coupled to receive a plurality of signals from the plurality of columns and operable to detect a touch event associated with the touch sensor based on the received plurality of signals.

13. The system of claim 12, wherein the signal processor for each of the plurality of columns are the same signal processor.

14. The system of claim 11, wherein the signal generator comprises, for each of the plurality of signals:
a digital generator;
a digital to analog converter coupled to receive an output of the digital generator; and
a transmitter coupled to receive an output of the digital to analog converter and coupled to output a signal of the plurality of signals to a row of the plurality of rows.

* * * * *